(12) United States Patent
Chu et al.

(10) Patent No.: US 7,684,987 B2
(45) Date of Patent: Mar. 23, 2010

(54) SEGMENTAL TONAL MODELING FOR TONAL LANGUAGES

(75) Inventors: Min Chu, Beijing (CN); Chao Huang, Chaoyang District (CN)

(73) Assignee: Microsoft Corporation, Redmond, WA (US)

( * ) Notice: Subject to any disclaimer, the term of this patent is extended or adjusted under 35 U.S.C. 154(b) by 1069 days.

(21) Appl. No.: 10/762,060

(22) Filed: Jan. 21, 2004

(65) Prior Publication Data

US 2005/0159954 A1    Jul. 21, 2005

(51) Int. Cl.
*G06F 17/20* (2006.01)
*G10L 15/00* (2006.01)
*G10L 15/04* (2006.01)
*G10L 15/28* (2006.01)
*G10L 15/18* (2006.01)
*G10L 13/00* (2006.01)
*G10L 13/08* (2006.01)

(52) U.S. Cl. .......................... 704/254; 704/8; 704/231; 704/236; 704/251; 704/255; 704/257; 704/258; 704/260

(58) Field of Classification Search .................. 704/251, 704/254, 231
See application file for complete search history.

(56) References Cited

U.S. PATENT DOCUMENTS

| | | | | |
|---|---|---|---|---|
| 5,220,639 | A * | 6/1993 | Lee | 704/200 |
| 5,623,609 | A * | 4/1997 | Kaye et al. | 704/1 |
| 5,680,510 | A * | 10/1997 | Hon et al. | 704/255 |
| 5,751,905 | A * | 5/1998 | Chen et al. | 704/254 |
| 6,510,410 | B1 * | 1/2003 | Chen et al. | 704/251 |
| 6,553,342 | B1 * | 4/2003 | Zhang et al. | 704/255 |
| 2001/0010039 | A1 * | 7/2001 | Yang | 704/239 |

FOREIGN PATENT DOCUMENTS

WO    WO 9623298    8/1996

OTHER PUBLICATIONS

Tan Lee; Ching, P.C.; Chan, L.W.; Cheng, Y.H.; Mak, B. "Tone recognition of isolated Cantonese syllables" Speech and Audio Processing, IEEE Transactions on, vol. 3, Iss.3, May 1995, pp. 204-209.*

Xuedong Huang; Acero, A.; Adcock, J.; Hsiao-Wuen Hon; Goldsmith, J.; Jingsong Liu; Plumpe, M. "Whistler: a trainable text-to-speech syste"Spoken Language, 1996. ICSLP 96. Proceedings., Fourth International Conference on, vol. 4, Iss., Oct. 3-6, 1996, pp. 2387-2390 vol. 4.*

Akinlabi, Akinbiyi & Mark Liberman. 2000. The tonal phonology of Yoruba clitics. In B. Gerlach and J. Grizjenhout (eds). Clitics in phonology, morphology and syntax, 31-62. Amsterdam: Benjamins.*

(Continued)

*Primary Examiner*—David R Hudspeth
*Assistant Examiner*—Paras Shah
(74) *Attorney, Agent, or Firm*—Steven M. Koehler; Westman, Champlin & Kelly, P.A.

(57) ABSTRACT

A phone set for use in speech processing such as speech recognition or text-to-speech conversion is used to model or form syllables of a tonal language having a plurality of different tones. Each syllable includes an initial part that can be glide dependent and a final part. The final part includes a plurality of phones. Each phones carries partial tonal information such that the phones taken together implicitly and jointly represent the different tones.

21 Claims, 5 Drawing Sheets

OTHER PUBLICATIONS

Hsin-Min Wang; Tai-Hsuan Ho; Rung-Chiung Yang; Jia-Lin Shen; Bo-Ren Bai; Jenn-Chau Hong; Wei-Peng Chen; Tong-Lo Yu; Lin-Shan Lee "Complete recognition of continuous Mandarin speech for Chinese language with very large vocabulary using limited training data" Speech and Audio Processing, IEEE Transactions on, vol. 5, Iss. 2, Mar. 1997, pp. 195-200.*

Lee, T., Lau, W., Wong, Y. W., and Ching, P. C. 2002. Using tone information in Cantonese continuous speech recognition. ACM Transactions on Asian Language Information Processing (TALIP) 1, 1 (Mar. 2002), 83-102. DOI=http://doi.acm.org/10.1145/595576.595581.*

Ao, Benjamin / Shih, Chilin / Sproat, Richard (1994): "A corpus-based Mandarin text-to-speech synthesizer", In ICSLP-1994, 1771-1774.*

Yang Cao; Yonggang Deng; Hong Zhang; Taiyi Huang; Bo Xu, "Decision tree based Mandarin tone model and its application to speech recognition," Acoustics, Speech, and Signal Processing, 2000. ICASSP '00. Proceedings. 2000 IEEE International Conference on , vol. 3, No., pp. 1759-1762 vol. 3, 2000.*

Fujisaki, Hiroya / Hirose, Keikichi / Halle, Pierre / Lei, Haitao (1990): "Analysis and modeling of tonal features in polysyllabic words and sentences of the standard Chinese", In ICSLP-1990, 841-844.*

Chang et al., "Large Vocabulary Mandarin Speech Recognition with Different Approaches in Modeling Tones", Proc. ICSLP '2000, vol. II, pp. 983-986, Oct. 2000.

Chen et al., "Recognize Tone Languages Using Pitch Information on the Main Vowel of Each Syllable", ICASSP 2001, Salt Lake City, 2001.

Seide et al., "Two-Stream Modeling of Mandarin Tones", ICSLP 2000, Beijing, 2000.

Ho et al., "Phonetic State Tied-Mixture Tone Modeling for Large Vocabulary Continuous Mandarin Speech Recognition", in EUROSPEECH '99, pp. 883-886.

Lin-shan Lee et al., "Golden Mandarin (I)-A Real Time Mandarin Speech Dictation Machine for Chinese Language with Very Large Vocabulary", IEEE Transaction on Speech and Audio Processing, pp. 158-179, Apr. 1993.

Official Search Report of the European Patent Office in counterpart foreign application No. EP05100347 filed Jan. 20, 2005.

Jiyong Zhang et al: "Improved Context-Dependent Acoustic Modeling for Continuous Chinese Speech Recognition" European Conference on Speech Communication and Technology (Eurospeech), vol. 3, 2001, pp. 1617-1620, Aalborg, Denmark.

Supphanat Kanokphara et al: "Syllable Structure Based Phonetic Units for Context-Dependent Continuous Thai Speech Recognition", European Conference on Speech Communication and Technology (Eurospeech), Sep. 2003, pp. 797-800, Geneva, Switzerland.

Wong Y W et al: "Acoustic Modeling and Language Modeling For Cantonese LVCSR" European Conference on Speech Communication and Technology (Eurospeech), vol. 3, Sep. 1999, pp. 1091-1094, Budapest, Hungary.

Jian-Lai Zhou et al: "Tone articulation modeling for mandarin spontaneous speech recognition", Acoustics, Speech, and Signal Processing, 2004. Proceedings. (ICASSP '04). IEEE International Conference on Montreal, Quebec, Canada May 17-21, 2004, Piscataway, NJ, USA, IEEE.

* cited by examiner

SEGMENTAL TONAL MODELING FOR TONAL LANGUAGES

BACKGROUND OF THE INVENTION

The present invention relates generally to the field of speech processing systems such as speech recognizers and text-to-speech converters. More specifically, the present invention relates to modeling units or set design, used in such systems.

Selecting the most suitable units, i.e. modeling units, to represent salient acoustic and phonetic information for a language is an important issue in designing a workable speech processing system such as a speech recognizer or text-to-speech converter. Some important criteria for selecting the appropriate modeling units include how accurate the modeling units can represent words, particularly in different word contexts; how trainable is the resulting model and whether parameters of units can be estimated reliably with enough data; and whether new words can be easily derived from the predefined unit inventory, i.e., whether the resulting model is generalizable.

Besides the overall factors to consider as provided above, there are several layers of units to be considered: phones, syllables and words. Their performances in term of the above criteria are very different. Word-based units should be a good choice for domain specific, such as a speech recognizer designed for digits. However, for LVCSR (large vocabulary, continuous speech recognizer), phone-based units are better since they are more trainable and generalizable.

Many speech processing systems now use context-dependent phones, like tri-phones, in the context of a state-sharing technology, e.g. Hidden Markov Modeling. The resulting systems have yielded good performance, particularly for western languages such as English. This is due in part to the smaller phone set of the western languages (e.g. English comprises only about 50 phones), which when modeled as context-dependent phones, like tri-phones, although theoretically would entail $50^3$ different tri-phones, practically such systems use less and are considered both trainable and generalizable.

Although phone-based systems such as systems based on Hidden Markov Modeling of triphones has been shown to work well with western languages like English, speech processing systems for tonal languages like Chinese have generally used syllables as the basis of the modeled unit. Compared with most western languages, there are several distinctive characteristics or differences of a tonal language such as Chinese Mandarin. First, the number of words is unlimited, while number of characters and syllables are fixed. Specifically, one Chinese character corresponds to one syllable. In total, there are about 420 base syllables and more than 1200 tonal ones.

Since Chinese is a tonal language, for each syllable, there are usually five tone types from tone 1 to tone 5, like {/ma1/ /ma2/ /ma3/ /ma4/ /ma5/}. Among the 5 tones, first four ones are normal tones, which have the shape of High Level, Rising, Low level and Falling. The fifth tone is a neutralization of the other four. Although the phones are the same, the real acoustic realizations are different because of the different tone types.

In addition to the 1-1 mapping between character and syllable, a defined structure exists inside the syllable. Specifically, each base syllable can be represented with the following form:

(C)+(G) V (V, N)

According to Chinese phonology, the first part before "+" is called initials, which mainly consists of consonants. There are 22 initials in Chinese and one of it is a zero initial, representing the cases when initials are absent. Parts after "+" are called finals. There are about 38 finals in Mandarin Chinese. Here (G), V and (V, N) are called head (glide), body (main vowel) and tail (coda) of finals respectively. Units in brackets are optional in constructing valid syllables.

As mentioned above, syllables have generally formed the basis of the modeled unit in a tonal language such as Mandarin Chinese. Such a system has generally not been used for western languages because of thousands of possible syllables exist. However, such representation is very accurate for Mandarin Chinese and the number of units is also acceptable. However, the number of tri-syllables is very large and tonal syllables make the situation even worse. Therefore, most of the current modeling strategies for Mandarin Chinese are based on the decomposition of syllable. Among them, syllables are usually decomposed into initial and final parts, while tone information is modeled separately or together with final parts. Nevertheless, shortcomings still exist with these systems and an improved modeling unit set is certainly desired.

SUMMARY OF THE INVENTION

A phone set for use in speech processing such as speech recognition or text-to-speech conversion is used to model or form syllables of a tonal language having a plurality of different tones. In one embodiment, each syllable includes an initial part that can be glide dependent and a final part. The final part includes a plurality of segments or phones. Each segment carries categorical tonal information such that the segments taken together implicitly and jointly represent the different tones. Since a tone contains two segments, one phone only takes part of the tone information and the two phones in a final part work together to represent the whole tone information. Stated yet another way, a first set of the plurality of phones is used to describe the initials, while a second set is used to describe the finals.

Embodied as either a speech processing system or a method of speech processing, the phone set is accessed and utilized to identify syllables in an input for performing one of speech recognition and text-to-speech conversion. An output is then provided corresponding to one of speech recognition and text-to-speech conversion.

DETAILED DESCRIPTION OF ILLUSTRATIVE EMBODIMENTS

Figure 1:
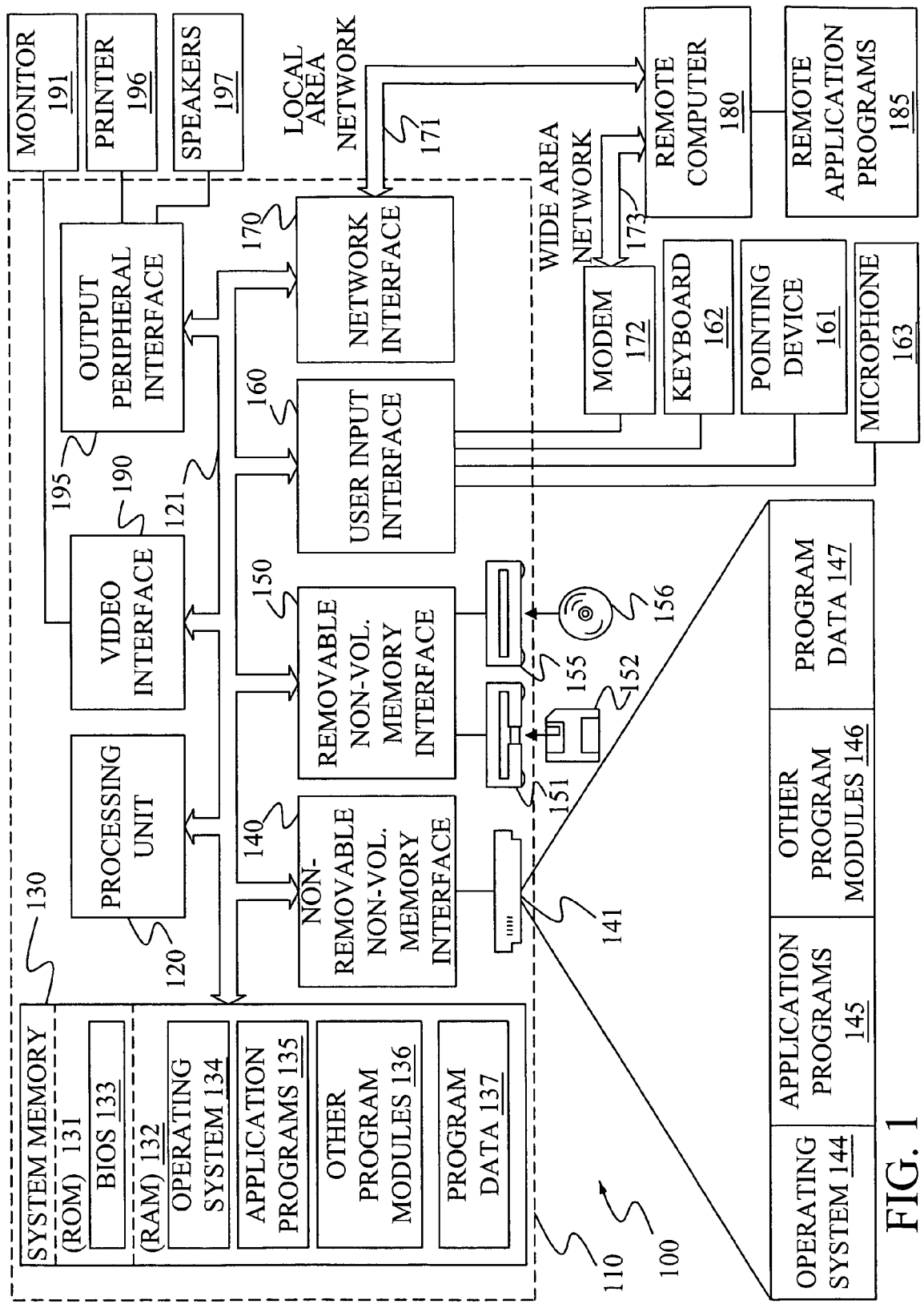
FIG. 1 is a block diagram of a general computing environment in which the present invention can be useful.

Prior to discussing the present invention in greater detail, an embodiment of an illustrative environment in which the present invention can be used will be discussed. FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. Those skilled in the art can implement the description and/or figures herein as computer-executable instructions, which can be embodied on any form of computer readable media discussed below.

The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
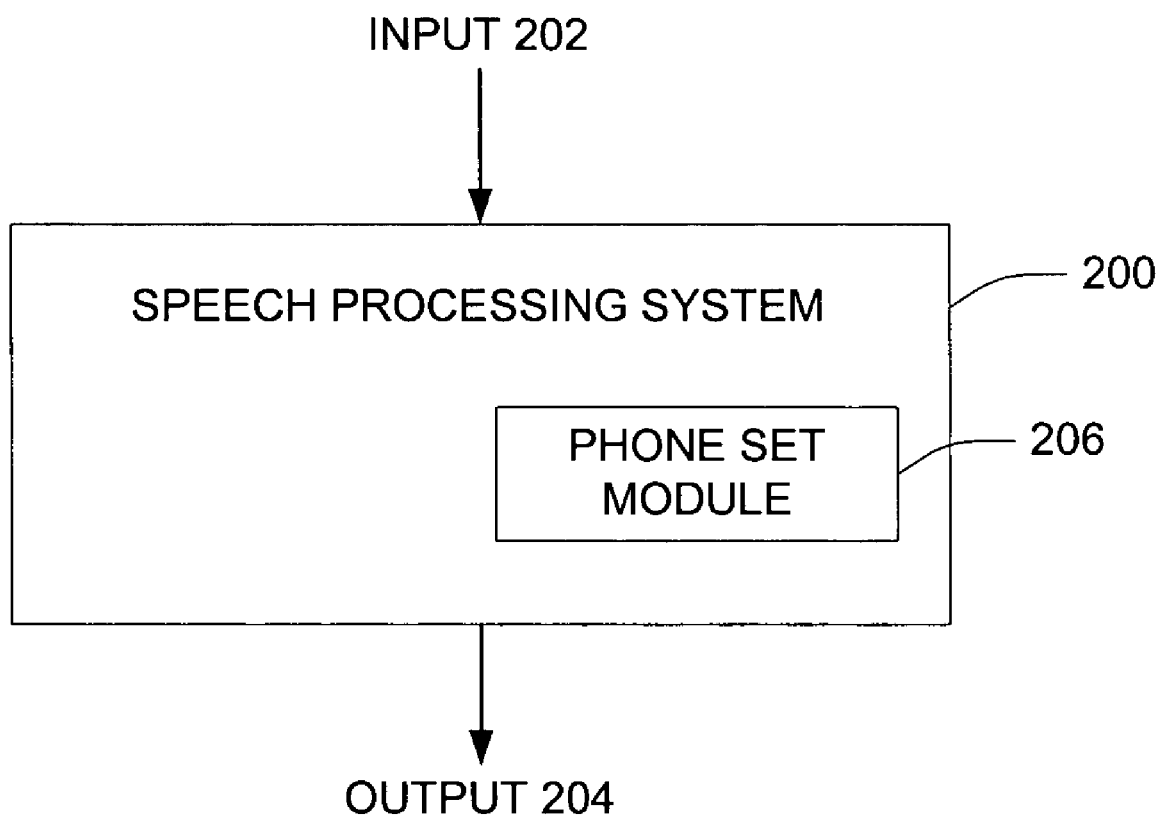
FIG. 2 is a block diagram of a speech processing system.

FIG. 2 generally illustrates a speech processing system 200 that receives an input 202 to provide an output 204, derived, in part, from a phone set described below. For example, the speech processing system 200 can be embodied as a speech recognizer that receives as an input, spoken words or phrases such as through microphone 163 to provide an output comprising text, for example, stored in any of the computer readable media storage devices. In another embodiment, the speech processing system 200 can be embodied as a text-to-speech converter that receives text, embodied for example on a computer readable media, and provides as an output speech that can be rendered to the user through speaker 197. It should be understood that these components can be provided in other systems, and as such are further considered speech processing systems as used herein.

During processing, the speech processing system 200 accesses a module 206 derived from the phone set discussed below in order to process the input 202 and provide the output 204. The module 206 can take many forms for example a model, database, etc. such as an acoustic model used in speech recognition or a unit inventory used in concatenative text-to-speech converters. The phone set forming the basis of module 206 is a segmental tonal model of a tonal language such as, but not limited to, Chinese (Mandarin, which is described below by way of example) Vietnamese, and Thai etc., including dialects thereof.

Figure 3:
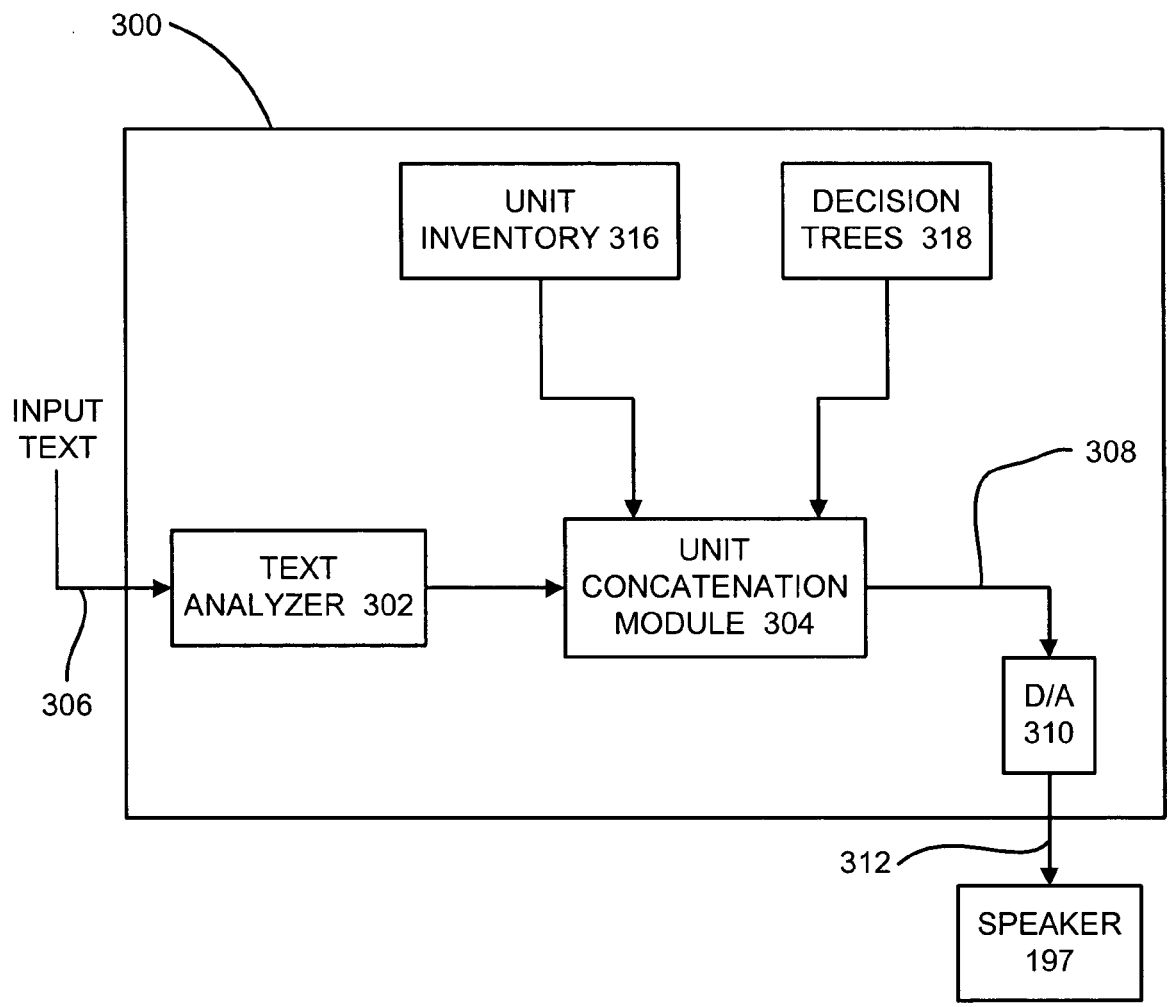
FIG. 3 is a block diagram of a text-to-speech converter.

An exemplary text-to-speech converter 300 for converting text to speech is illustrated in FIG. 3. Generally, the converter 300 includes a text analyzer 302 and a unit concatenation module 304. Text to be converted into synthetic speech is provided as an input 306 to the text analyzer 302. The text analyzer 302 performs text normalization, which can include expanding abbreviations to their formal forms as well as expanding numbers, monetary amounts, punctuation and other non-alphabetic characters into their full word equivalents. The text analyzer 302 then converts the normalized text input to a string of sub-word elements, such as phonemes, by known techniques. The string of phonemes is then provided to the unit concatenation module 304. If desired, the text analyzer 302 can assign accentual parameters to the string of phonemes using prosodic templates, not shown.

The unit concatenation module 304 receives the phoneme string and constructs synthetic speech input, which is provided as an output signal 308 to a digital-to-analog converter 310, which in turn, provides an analog signal 312 to the speaker 197. Based on the string input from the text analyzer 302, the unit concatenation module 304 selects representative instances from a unit inventory 316 after working through corresponding decision trees stored at 318. The unit inventory 316 is a store of context-dependent units of actual acoustic data, such as in decision trees. In one embodiment, triphones (a phoneme with its one immediately preceding and succeeding phonemes as the context) are used for the context-dependent units. Other forms of units include quinphones and diphones. The decision trees 318 are accessed to determine which unit is to be used by the unit concatenation module 304. In one embodiment, the unit is one phone for each of the phones of the phone set discussed below.

The phone decision tree 318 is a binary tree that is grown by splitting a root node and each of a succession of nodes with a linguistic question associated with each node, each question asking about the category of the left (preceding) or right (following) phone. The linguistic questions about a phone's left or right context are usually generated by an expert in linguistics in a design to capture linguistic classes of contextual effects based on the phone set discussed below. In one embodiment, Hidden Markov Models (HMM) are created for each unique context-dependent phone-based unit. Clustering is commonly used in order to provide a system that can run efficiently on a computer given its capabilities.

As stated above, the unit concatenation module 304 selects the representative instance from the unit inventory 316 after working through the decision trees 318. During run time, the unit concatenation module 304 can either concatenate the best preselected phone-based unit or dynamically select the best phone-based unit available from a plurality of instances that minimizes a joint distortion function. In one embodiment, the joint distortion function is a combination of HMM score, phone-based unit concatenation distortion and prosody mismatch distortion. The system 300 can be embodied in the computer 110 wherein the text analyzer 302 and the unit concatenation module 304 are hardware or software modules, and where the unit inventory 316 and the decision trees 318 can be stored using any of the storage devices described with respect to computer 110.

As appreciated by those skilled in the art, other forms of text-to-speech converters can be used. Besides the concatenative synthesizer 304 described above, articulator synthesizers and formant synthesizers can also be used to provide text-to-speech conversion.

Figure 4:
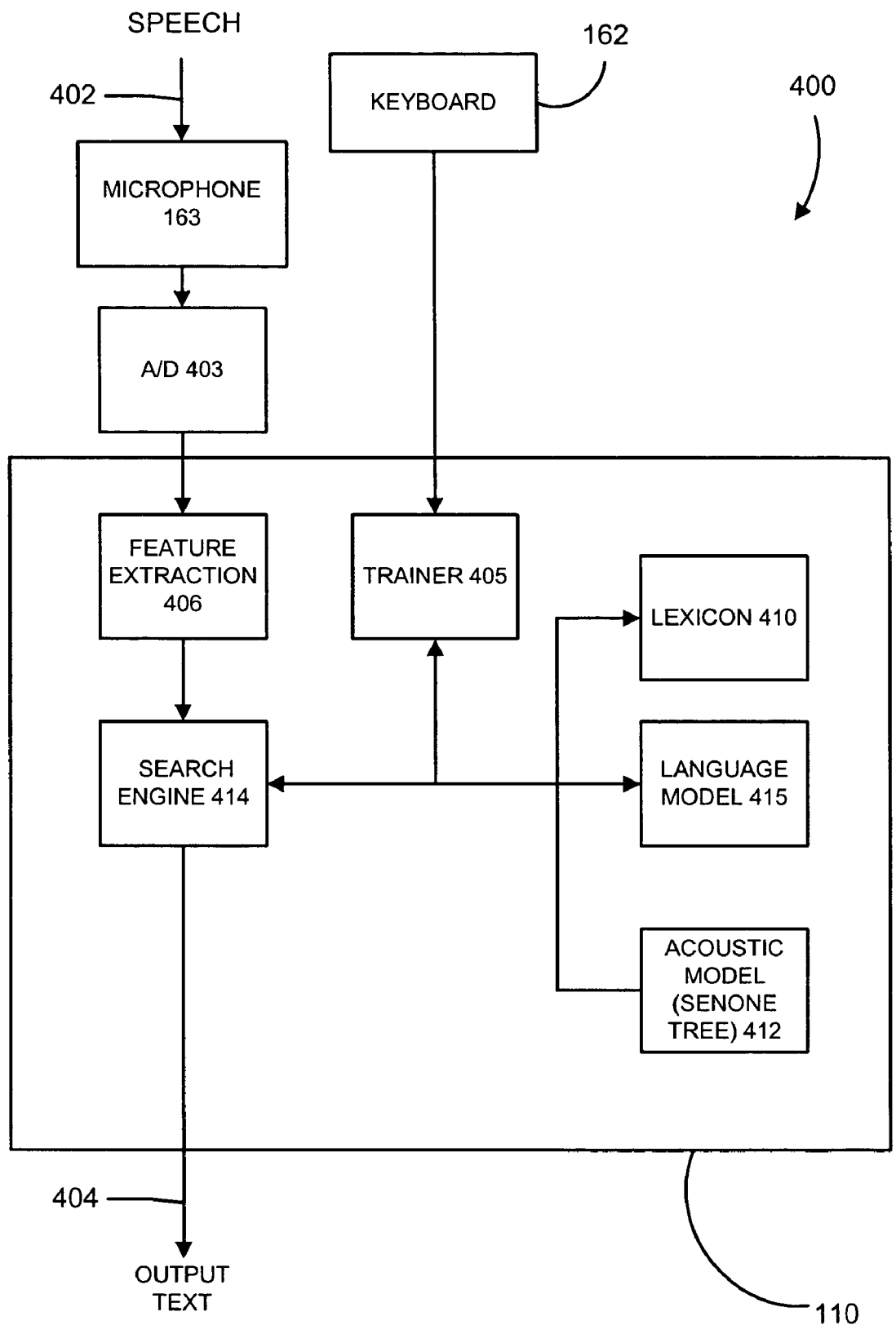
FIG. 4 is a block diagram of a speech recognition system.

In a further embodiment, the speech processing system 200 can comprise a speech recognition module or speech recognition system, an exemplary embodiment of which is illustrated in FIG. 4 at 400. The speech recognition system 400 receives input speech from the user at 402 and converts the input speech to the text 404. The speech recognition system 400 includes the microphone 163, an analog-to-digital (A/D) converter 403, a training module 405, feature extraction module 406, a lexicon storage module 410, an acoustic model 412, a search engine 414, and a language model 415. It should be noted that the entire system 400, or part of speech recognition system 400, can be implemented in the environment illustrated in FIG. 1. For example, microphone 163 can preferably be provided as an input device to the computer 110, through an appropriate interface, and through the A/D converter 403. The training module 405 and feature extraction module 406 can be either hardware modules in the computer 110, or software modules stored in any of the information storage devices disclosed in FIG. 1 and accessible by the processing unit 120 or another suitable processor. In addition, the lexicon storage module 410, the acoustic model 412, and the language model 415 are also preferably stored in any of the memory devices shown in FIG. 1. Furthermore, the search engine 414 is implemented in processing unit 120 (which can include one or more processors) or can be performed by a dedicated speech recognition processor employed by the personal computer 110.

In the embodiment illustrated, during speech recognition, speech is provided as an input into the system 400 in the form of an audible voice signal by the user to the microphone 163. The microphone 163 converts the audible speech signal into an analog electronic signal, which is provided to the A/D converter 403. The A/D converter 403 converts the analog speech signal into a sequence of digital signals, which is provided to the feature extraction module 406. In one embodiment, the feature extraction module 406 is a conventional array processor that performs spectral analysis on the digital signals and computes a magnitude value for each frequency band of a frequency spectrum. The signals are, in one illustrative embodiment, provided to the feature extraction module 406 by the A/D converter 403 at a sample rate of approximately 16 kHz, although other sample rates can be used.

The feature extraction module 406 divides the digital signal received from the A/D converter 403 into frames that include a plurality of digital samples. Each frame is approximately 10 milliseconds in duration. The frames are then encoded by the feature extraction module 406 into a feature vector reflecting the spectral characteristics for a plurality of frequency bands. In the case of discrete and semi-continuous Hidden Markov Modeling, the feature extraction module 406 also encodes the feature vectors into one or more code words using vector quantization techniques and a codebook derived from training data. Thus, the feature extraction module 406 provides, at its output the feature vectors (or code words) for each spoken utterance. The feature extraction module 406 provides the feature vectors (or code words) at a rate of one feature vector or (code word) approximately every 10 milliseconds.

Output probability distributions are then computed against Hidden Markov Models using the feature vector (or code words) of the particular frame being analyzed. These probability distributions are later used in executing a Viterbi or similar type of processing technique.

Upon receiving the code words from the feature extraction module 406, the search engine 414 accesses information stored in the acoustic model 412. The model 412 stores acoustic models, such as Hidden Markov Models, which represent speech units to be detected by the speech recognition system 400. In one embodiment, the acoustic model 412 includes a senone tree associated with each Markov state in a Hidden Markov Model. The Hidden Markov models represent the phone set discussed below. Based upon the senones in the acoustic model 412, the search engine 414 determines the most likely phones represented by the feature vectors (or code words) received from the feature extraction module 406, and hence representative of the utterance received from the user of the system.

The search engine 414 also accesses the lexicon stored in module 410. The information received by the search engine 414 based on its accessing of the acoustic model 412 is used in searching the lexicon storage module 410 to determine a word that most likely represents the codewords or feature vector received from the features extraction module 406. Also, the search engine 414 accesses the language model 415, which can take many different forms such those employing N-grams, context-free grammars or combinations thereof. The language model 415 is also used in identifying the most likely word represented by the input speech. The most likely word is provided as output text 404.

As appreciated by those skilled in the art, other forms of speech recognition systems can used. Besides the Hidden Markov Modeling recognizer described above, recognizers based on Artificial Neural Network (ANN), Dynamic Time Wrapping (DTW) respectively or the combinations of them like hybrid ANN-HMM system etc. can also benefit from modules derived from the phone set described below.

As discussed in the Background section above, a base syllable in Chinese can be represented with the following form:

$$(C)+(G) V (V, N)$$

where, the first part before "+" is called initials, which mainly consists of consonants, and the parts after "+" are called finals, and where (G), V and (V, N) are called head (glide), body (main) and tail (coda) of finals respectively, and the units in brackets are optional in constructing valid syllables.

At this point it should be noted that the form provided above is used herein for purposes of explaining aspects of the present invention; however this form should not be considered required or limiting. In other words, it should be understood different forms may be used as alternative structures for describing syllables in Chinese and other tonal languages, and that specific details, beyond those discussed below, regarding such forms are essentially independent of the phone set described herein.

In general, a new phone set, herein called segmental tonal modeling, comprises three parts for each syllable of the form:

$$CG\ V1\ V2$$

Where CG corresponds to (C) (G) in the form mentioned above, but includes the glide, thereby yielding a glide-dependent initial. However, use of the word "initial" should not be confused with "initial" as used above since the glide, which was considered part of the final has been now associated with this first part. Assigning the glide to the initial or first part extends the unit inventory from that of the first form.

With respect to Chinese Mandarin, there are only three valid glides /u/, /ü/ (to simplify the labeling, /v/ is used to represent /ü/) and /i/, so each initial consonant is classified into four categories at most. In fact, most of them have only 2 or 3 three categories since some consonant-glide combinations are invalid in Mandarin. For example, for consonant /t/, there exists /t/, /ti/ and /tu/, while for consonant /j/, there exists only /ji/ and /jv/.

V1 and V2, of the present inventive form, collectively provide the remaining syllable information (refer as main final in this invention) including the tonal information. V1 can be considered as representing a first portion of the main final information, which may in some syllables represent the first vowel if the main final contains two phonemes and in some syllables represent the first portion of the phoneme if the main final has only one phoneme, and carries or includes a first portion of tonal information as well. V2 can be considered as representing a second portion of the main final information, which may in some syllables represent the second phonemes when the main final contains two phonemes and in some syllables represent the second portion of the phoneme when the main final has only one phoneme, and carries or includes a second portion of tonal information. In other words, instead of modeling tone types directly, tones are realized implicitly and jointly by a plurality of parts, e.g. two parts or segments (herein also called "segmental toneme"), which both carry tonal information.

Figure 5:
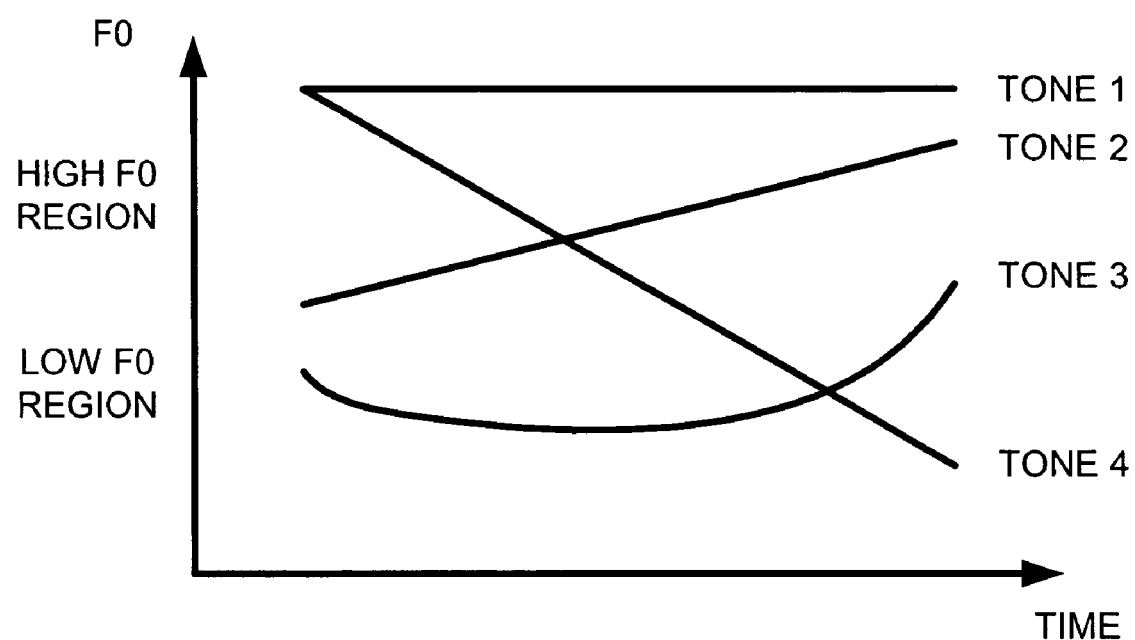
FIG. 5 is graph illustrating tone types in Mandarin Chinese.

Associated with each of V1 and V2 is tonal information. As is known in Mandarin Chinese, there exists five different tones, four of which are illustrated in FIG. 5. The fifth tone is a neutralization mode of the other four. In the embodiment described herein, the different tone types are described by the combination of three categorical pitch levels according to their relative pitch region, herein illustrated as high (H), medium (M) and low (L), i.e. the tone types illustrated in FIG. 5 can be classified in categorical levels as high-high high (HH) for tone 1, low-high (LH) or middle-high (MH) for tone 2, low-low (LL) for tone 3 and high-low (HL) for tone 4. Tone 5, the neutral tone, can either share the pattern of tone 4 or tone 3 according to the previous tone types, or be modeled separately as medium-medium (MM). The first mark in the tone pattern is attached to V1 and the second part is attached to V2.

At this point an example may be helpful. Table 1 below provides the decomposition of the tonal syllable /zhuang$/ where $={1,2,3,4,5} represents the five different tones for the syllable.

TABLE 1

| Tonal syllable | CG | V1 | V2 |
|---|---|---|---|
| /zhuang1/ | /ZHU/ | /aaH/ | /ngH/ |
| /zhuang2/ | | /aaL/ or /aaM/ | /ngH/ |
| /zhuang3/ | | /aaL/ | /ngL/ |
| /zhuang4/ | | /aaH/ | /ngL/ |
| /zhuang5/ | | /aaM/ | /ngM/ |

In the present inventive form, {zhu} and {aaH, aaM, aaL, ngH, nhM, ngL} become a part of final phone set. As mentioned above, instead of appending 5 tones into Final parts (/uang/), the glide /u/ is assigned into Initial part /zh/, forming /zhu/. The remainder part /ang$/ of the syllable is segmented into two phonemes /a/+/ng/ and labeled as /aa/+/ng/ based on phonology, then tone 1~5 are realized by combinations of H/L/M, which finally attached with the corresponding phonemes (like /aa/ and /ng/).

In some syllables, the final part contains only one phoneme, such as /zha/. Nevertheless, the final part is segmented into two parts (/aa/ for V1 and /aa/ for V2) to achieve consistency in syllable decomposition. Table 2 illustrates the decomposition of /zha$/ using the present inventive form.

TABLE 2

| Tonal syllable | CG | V1 | V2 |
|---|---|---|---|
| /zha1/ | /ZH/ | /aH/ | /aH/ |
| /zha2/ | | /aL/ or /aM/ | /aH/ |
| /zha3/ | | /aL/ | /aL/ |
| /zha4/ | | /aH/ | /aL/ |
| /zha5/ | | /aM/ | /aM/ |

Using the techniques described above, a phone set with 97 units (plus /sil/ for silence) can be realized in which 57 are used to describe glide dependent initials and remaining 39 are used to describe final parts (V1 and V2). Table 3 provides the phone list comprising 97 units (plus /sil/) where the left column is initial-related, while the right column provides segmental tonemes that correspond to the main final parts. It should be noted that to keep the consistent decomposition structure for all valid syllables; several phone units are explicitly created for syllables without initial consonants, i.e. the so called zero-initial case, which are denoted as /ga/, /ge/ and /go/ in Table 3. The second symbol in them is decided by the first phoneme of the final parts. E.g. the CG for syllable /an1/ is /ga/ and the CG for syllable /en1/ is /ge/. However, doing this is not necessary if the speech processing system does not require the same syllable structure all the time. And in some realizations, the three can be merged into one.

TABLE 3

| | | | | | |
|---|---|---|---|---|---|
| B | bi | bu | aaM | aaH | aaL |
| C | | cu | aM | aH | aL |
| Ch | | chu | ehM | ehH | ehL |
| D | di | du | elM | elH | elL |
| F | | fu | erM | erH | erL |
| g | | gu | ibM | ibH | ibL |
| /ga/ge/go/ (zero-initials) | | | ifM | ifH | ifL |
| H | | hu | iM | iH | iL |
| | ji | | jv | ngM | ngH | ngL |
| K | | ku | nnM | nnH | nnL |
| L | li | lu | lv | oM | oH | oL |
| M | mi | mu | uM | uH | uL |
| N | ni | nu | nv | vM | vH | vL |
| P | pi | pu | sil | | |
| | qi | | qv | | | |
| R | | ru | | | |
| S | | su | | | |
| Sh | | shu | | | |
| T | ti | tu | | | |
| | | wu | | | |
| | xi | | xv | | | |
| | yi | | yv | | | |
| Z | | zu | | | |
| Zh | | zhu | | | |

A detailed phone list and the syllable to phone set mappings are indicated below. However, it should be noted that phoneme /a/ in /ang/ and in /an/ is represented by different symbols (phones) /a/ and /aa/ in Table 4 because the place of articulation of the two are slightly different. These phones can be merged to form one unit, if a smaller phone set is desired or there does not exist a sufficient amount of training data. Another pair that can be merged is /el/ and /eh/.

The full list of mappings between syllable and phone inventory can be deduced from Table 3 and Table 4. As we mentioned at background parts, there are about more than 420 base syllables and more than 1200 tonal syllables. To save the space,. instead of listing all mapping pairs, only the mappings between the standard finals (38) and the phones in inventory are listed in Table 4. The full list between syllables and phones can be easily extracted according to the decomposition method introduced above and Table 4. For example, for syllable /tiao4/, which consists initial t and final /iao/ and tone 4, Table 4 indicates that /iao/→ /i/+/aa/+/o/. Based on above decomposition strategy, glides /i/ will be merged with initial and formed glide-dependent initial /ti/ while tone 4 will be decomposed to HL, therefore, the mapping of tonal syllable /tiao4/ become /tiao4/→/ti/+/aaH/+/oL/. In addition, basically, V1 and V2 of the inventive form should have both tonal tags such as H, M and L, while V1 and V2 shown at Table 4 are the just the base form of phoneme without tonal tags.

TABLE 4

Decomposition table for all standard Finals without tone

| Finals | Glides | V1 | V2 |
|---|---|---|---|
| a | — | a | a |
| ai | — | a | eh |
| an | — | a | nn |
| ang | — | aa | ng |
| ao | — | aa | o |
| e | — | el | el |
| ei | — | eh | i |
| en | — | el | nn |
| eng | — | el | ng |
| er | — | er | |
| i | i | i | i |
| ia | i | a | a |
| ian | i | a | nn |
| iang | i | aa | ng |
| iao | i | aa | o |
| ib(for the/i/in/zhi/) | i | ib | ib |
| ie | i | eh | eh |
| if (for the/i/in/zi/) | i | if | if |
| in | i | i | nn |
| ing | i | el | ng |
| iong | i | u | ng |
| iu | i | o | u |
| o | u | u | o |
| ong | u | u | ng |
| ou | — | o | u |
| u | u | u | u |
| ua | u | a | a |
| uai | u | a | eh |
| uan | u | a | nn |
| uang | u | aa | ng |
| ui | u | eh | i |
| un | u | el | nn |
| uo | u | o | o |
| v | v | v | v |
| van | v | eh | nn |
| ve | v | eh | eh |
| vn | v | el | nn |

Use of the phone set construction as described above can provide several significant advantages including that the phone set for a tonal language such as Chinese has been reduced, while maintaining necessary distinction for accuracy in both speech recognition and text-to-speech conversion. In addition, the syllable construction is also consistent with findings and descriptions of phonologist on tones such as tones found in Chinese. Syllables created using the construction above are also consistent, regardless of presence of optional parts. In addition, syllables embodied as three parts (initial and two part finals) is more suitable for the state-of-the-art search framework and therefore yields more efficiency than with normal 2-part decomposition of syllables during fan-out extensions in speech recognition. Furthermore, each tonal syllable has a fixed segment structure (e.g. three segments), which can be potentially applied to decoding as a constraint to improve the search efficiency. Finally, detailed modeling of initials by building glide-dependent initials can aid in distinguishing each of the initials from each other.

Although the present invention has been described with reference to particular embodiments, workers skilled in the art will recognize that changes may be made in form and detail without departing from the spirit and scope of the invention. For example, under the basic idea of representing the typical tone types with segmental toneme, this concept can easily extend the current 2-value (High/Low) quantization on pitch level into more detailed levels, such as 3-value (as High/Middle/Low) or even 5-value (like 1~5) to depict the pattern of the typical tone types in details, if desired. If five values are used for Mandarin Chinese tones, the following representation could be used: 5-5 for tone 1, 3-5 or 2-5 for tone 2, 2-1 for tone 3 and 5-1, 5-2 or 4-1 for tone 4. However, it should be more meaningful for tonal languages with more tone types, such as Cantonese, which has about nine tone types. Cantonese is a very important dialect of Chinese commonly used by Hongkong, south of China, overseas Chinese, etc.

What is claimed is:

1. A speech processing system receiving an input related to one of speech and text and process the input to provide an output related to one of speech and text, the speech processing system comprising:
    a module derived from a phone set having a plurality of phones for a tonal language, wherein the tonal language comprises a plurality of different tones with different levels of pitch, the phones being used to model syllables used in the module, the syllables having an initial part and a final part, wherein at least some of the syllables of the tonal language include a glide, the glide being embodied in the initial part, and wherein the final part comprises a first temporal portion corresponding to a first relative pitch and a second temporal portion corresponding to a second relative pitch, wherein the first portion and the second portion jointly and implicitly carry tonal information, and wherein the different levels of pitch comprise at least two discrete categorical levels, and wherein each portion has a discrete categorical level associated with it; and
    a processor configured to receive an input related to one of speech and text and access the module to process the input to provide an output related to one of speech and text.

2. The speech processing system of claim 1 wherein the different levels of pitch comprise three categorical levels, and wherein each portion has a discrete categorical level associated with it.

3. The speech processing system of claim 1 wherein the different levels of pitch comprise five categorical levels, and wherein each portion has a discrete categorical level associated with it.

4. The speech processing system of claim 1 wherein the speech processing system comprises one of a speech recognition system and a text-to-speech converter.

5. The speech processing system of claim 4 wherein the different levels of pitch comprise two categorical levels, and wherein each portion has a discrete categorical level associated with it.

6. The speech processing system of claim 4 wherein the different levels of pitch comprise three categorical levels, and wherein each portion has a discrete categorical level associated with it.

7. The speech processing system of claim 4 wherein the different levels of pitch comprise five categorical levels, and wherein each portion has a discrete categorical level associated with it.

8. The speech processing system of claim 1 wherein the tonal language comprises Chinese or a dialect thereof, such as Cantonese.

9. The speech processing system of claim 1 wherein the tonal language comprises Thai or a tonal dialect thereof.

10. The speech processing system of claim 1 wherein the tonal language comprises Vietnamese or a tonal dialect thereof.

11. A speech processing system receiving an input related to one of speech and text and process the input to perform one of speech recognition and text-to-speech conversion in order to provide an output related to one of speech and text, the speech processing system comprising:

a module derived from a phone set having a plurality of phones for a tonal language comprising a plurality of different tones with different levels of pitch, the phones being used to model syllables used in the module, at least some of the syllables having an initial part and final part, wherein a first set of the plurality of phones are used to describe the glide dependent initial part, and a second set of the plurality of phones are used to describe the final part, wherein the final part comprises a first temporal phone corresponding to a first relative pitch and a second temporal phone corresponding to a second relative pitch, and wherein the different levels of pitch comprise at least two discrete categorical levels, and wherein each phone has a discrete categorical level associated with it; and a processor configured to receive an input related to one of speech and text and access the module to process the input to provide an output related to one of speech and text.

12. The speech processing system of claim 11 wherein the different levels of pitch comprise three categorical levels, and wherein each phone has a discrete categorical level associated with it.

13. The speech processing system of claim 11 wherein the different levels of pitch comprise five categorical levels, and wherein each phone has a discrete categorical level associated with it.

14. The speech processing system of claim 11 wherein at least one syllable comprises only the final part having two phones carrying partial tonal information each.

15. A computer readable storage media having instructions, which when implemented on a computing device perform speech processing comprising:

accessing a module having a phone set comprising a plurality of phones for a tonal language; wherein the tonal language comprises a plurality of different tones with different levels of pitch; the phones being used to model syllables, the syllables having an initial part and final part; wherein at least some of the syllables of the tonal language include a glide, the glide being embodied in the initial part; and wherein the final part comprises a first temporal phone corresponding to a first relative pitch and a second temporal phone corresponding to a second relative pitch; wherein the first and second phones jointly and implicitly carry tonal information; and wherein the different levels of pitch comprise at least two discrete categorical levels, and wherein each phone has a discrete categorical level associated with it;

utilizing the phone set to identify syllables corresponding to the input for performing one of speech recognition and text-to-speech conversion; and providing an output corresponding to one of speech recognition and text-to-speech conversion.

16. The computer readable storage media of claim 15 wherein the different levels of pitch comprise three categorical levels, and wherein each portion has a discrete categorical level associated with it.

17. The computer readable storage media of claim 15 wherein the different levels of pitch comprise five categorical levels, and wherein each portion has a discrete categorical level associated with it.

18. The computer readable storage media of claim 15 wherein the speech processing system comprises one of a speech recognition system and a text-to-speech converter.

19. The computer readable storage media of claim 18 wherein the different levels of pitch comprise two categorical levels, and wherein each portion has a discrete categorical level associated with it.

20. The computer readable storage media of claim 18 wherein the different levels of pitch comprise three categorical levels, and wherein each portion has a discrete categorical level associated with it.

21. The computer readable storage media of claim 18 wherein the different levels of pitch comprise five categorical levels, and wherein each portion has a discrete categorical level associated with it.

* * * * *